United States Patent
Izhaki et al.

(10) Patent No.: US 12,085,638 B1
(45) Date of Patent: Sep. 10, 2024

(54) DIRECTIONAL SEARCH AND RESCUE SYSTEM AND METHOD

(71) Applicant: ELBIT SYSTEMS C4I AND CYBER LTD., Netanya (IL)

(72) Inventors: David Izhaki, Netanya (IL); Doron Efergan, Netanya (IL); Yigal Ezer, Netanya (IL)

(73) Assignee: ELBIT SYSTEMS C4I AND CYBER LTD., Netanya (IL)

( * ) Notice: Subject to any disclaimer, the term of this patent is extended or adjusted under 35 U.S.C. 154(b) by 0 days.

(21) Appl. No.: 18/626,387

(22) Filed: Apr. 4, 2024

Related U.S. Application Data

(63) Continuation of application No. PCT/IL2023/051001, filed on Sep. 14, 2023.

(30) Foreign Application Priority Data

Oct. 30, 2022 (IL) .......................... 297816

(51) Int. Cl.
*G01S 13/76* (2006.01)
*H04B 1/707* (2011.01)
*H04W 52/02* (2009.01)

(52) U.S. Cl.
CPC ............ *G01S 13/765* (2013.01); *H04B 1/707* (2013.01); *H04W 52/0245* (2013.01)

(58) Field of Classification Search
CPC ... G01S 13/765; H04B 1/707; H04W 52/0245
See application file for complete search history.

(56) References Cited

U.S. PATENT DOCUMENTS

| | | | | |
|---|---|---|---|---|
| 4,001,828 A * | 1/1977 | Culpepper | ................ | G01S 3/46 342/419 |
| 4,023,177 A * | 5/1977 | Bukhman | ................ | G01S 3/42 342/423 |
| 7,944,351 B1 * | 5/2011 | Giallorenzi | .......... | G08B 25/014 340/539.11 |
| 8,345,597 B2 * | 1/2013 | Poisel | ................... | H04W 64/00 370/252 |
| 8,804,460 B1 * | 8/2014 | Price | ......................... | G01S 3/80 367/127 |
| 2002/0036569 A1 * | 3/2002 | Martin | ............... | G08B 21/0222 340/572.1 |
| 2003/0156495 A1 * | 8/2003 | Haase | ..................... | G01S 15/74 367/119 |
| 2007/0176825 A1 * | 8/2007 | Goldberg | ................ | H04B 7/08 455/562.1 |
| 2010/0194622 A1 * | 8/2010 | Clingman | ................ | G08G 5/06 342/386 |

(Continued)

*Primary Examiner* — Peter M Bythrow
(74) *Attorney, Agent, or Firm* — S. J. Intellectual Property Ltd.

(57) ABSTRACT

The presently disclosed subject matter aims for a search and rescue system and method for a secure Direction Finding (DF) that utilizes a stealth communication technique between the search platform's radio and the radio of the survivor. The search and rescue system and method contain an omnidirectional antenna including a plurality of sectors, each capable of receiving one or more spread-spectrum signals composed of one or more symbols multiplied by a spread spectrum sequence, from a corresponding direction.

14 Claims, 3 Drawing Sheets

(56) References Cited

U.S. PATENT DOCUMENTS

| | | | |
|---|---|---|---|
| 2012/0258741 A1* | 10/2012 | Tillson | G01S 11/06 |
| | | | 455/457 |
| 2013/0293421 A1* | 11/2013 | Bartone | G01S 1/045 |
| | | | 342/386 |
| 2014/0302869 A1* | 10/2014 | Rosenbaum | H04W 4/026 |
| | | | 455/456.1 |
| 2015/0077282 A1* | 3/2015 | Mohamadi | G01S 19/13 |
| | | | 342/450 |
| 2016/0103199 A1* | 4/2016 | Rappaport | G01S 3/48 |
| | | | 342/377 |
| 2016/0315686 A1* | 10/2016 | Song | H04B 7/086 |
| 2017/0270775 A1* | 9/2017 | Haase | G01S 3/86 |
| 2018/0024220 A1* | 1/2018 | Massarella | G01S 3/043 |
| | | | 342/417 |
| 2018/0074161 A1* | 3/2018 | Rosenbaum | G01S 11/04 |
| 2018/0123238 A1* | 5/2018 | Fenn | H01Q 25/02 |

* cited by examiner

DIRECTIONAL SEARCH AND RESCUE SYSTEM AND METHOD

TECHNICAL FIELD

The present invention relates to the field of search and rescue systems and methods.

BACKGROUND

Search and rescue (SAR) is the search for and provision of aid to people in distress or imminent danger. The operation of searching and providing assistance is usually mounted by emergency services and/or response teams who typically follow a doctrine or set of guidelines when constructing a search plan for locating and recovering a lost person, locating and recovering disaster victims, and the like.

The general field of search and rescue includes various specialty sub-fields, typically determined by the type of terrain the search is conducted over, e.g., mountain search and rescue, ground search and rescue, urban search and rescue, combat search and rescue, air-sea search and rescue, etc.

Though numerous Search and Rescue solutions exist, these existing solutions are mainly based on an open communication technique between a search platform's radio device and a radio device of a survivor or survivors. This type of communication technique may endanger the survivor or survivors and impact their chances of being rescued, specifically in cases where the survivor/s are in a hostile environment, as this communication is vulnerable to detection by hostile elements in a relatively straightforward manner.

Thus, there is a need in the art for a new search and rescue system and method.

GENERAL DESCRIPTION

In accordance with a first aspect of the presently disclosed subject matter, there is provided a directional search and rescue system containing an omnidirectional antenna including a plurality of sectors, each sector capable of receiving one or more spread-spectrum signals composed of one or more symbols multiplied by a spread spectrum sequence, from a corresponding direction, the directional search and rescue system comprising a processing circuitry configured to: receive, by each sector of the plurality of sectors, at periodic time intervals, one or more spread-spectrum signals transmitted by a survivor device associated with a survivor party aimed to be rescued; decode, at each sector of the plurality of sectors, the received one or more spread-spectrum signals, utilizing the spread spectrum sequence, given rise to one or more decoded spread-spectrum signals; determine, at each sector of the at least some sectors, a signal strength of the one or more decoded spread-spectrum signals; and, upon the signal strength determined at a given sector being above a strength threshold, determine the corresponding direction of the given sector as the direction to the survivor party aimed to be rescued.

In some cases, the signal strength is determined using a Received Signal Strength Indicator (RSSI).

In some cases, the determination of the corresponding direction of the given sector as the direction to the survivor party aimed to be rescued is further determined by: (a) determining, at each sector of the at least some sectors, a signal phase direction, and (b) determining whether the signal phase direction of each sector exceeds a signal phase direction threshold.

In some cases, the signal phase direction is determined using one of: phase direction-based methods, or combined phase and amplitude sensitive-based methods.

In some cases, the one or more spread-spectrum signals of the survivor device are transmitted in response to reception of one or more spread-spectrum signals transmitted by the omnidirectional antenna.

In some cases, a distance between the omnidirectional antenna and the survivor device is determined by dividing a time gap between a transmission time of the one or more spread-spectrum signals transmitted by the omnidirectional antenna and a transmission time of the one or more spread-spectrum signals transmitted by the survivor device, by the speed of light.

In some cases, along with the reception of the one or more spread-spectrum signals transmitted by the omnidirectional antenna, the survivor device receives the strength level of the one or more decoded spread-spectrum signals received by the omnidirectional antenna and, based on said strength level, adjusts the transmission power of the following one or more spread-spectrum signals, transmitted by the survivor device, thereby preserving the survivor device's battery life available for future communication and contributing to the secrecy of the transmitted one or more spread-spectrum signals.

In accordance with a second aspect of the presently disclosed subject matter, there is provided a directional search and rescue system containing an omnidirectional antenna including a plurality of sectors, each sector capable of receiving, from a corresponding direction, one or more spread-spectrum signals composed of one or more symbols multiplied by a spread spectrum sequence, the directional search and rescue system comprising a processing circuitry configured to: transmit, by the omnidirectional antenna, one or more first spread-spectrum signals composed of one or more first symbols multiplied by the spread spectrum sequence; receive, by each sector of the plurality of sectors, at periodic time intervals, one or more second spread-spectrum signals, including one or more second symbols multiplied by the spread spectrum sequence, transmitted by a survivor device associated with a survivor party aimed to be rescued; decode, at each sector of the plurality of sectors, at least a portion of the received one or more second spread-spectrum signals, given rise to one or more decoded second spread-spectrum signal portions; determine, at each sector of the plurality of sectors, whether the second symbols of the one or more second decoded spread-spectrum signal portions overlap with the first symbols of a respective portion of the one or more first spread-spectrum signals transmitted by the omnidirectional antenna; and upon the second symbols of the one or more decoded second spread-spectrum signal portions overlap with the first symbols of the respective portion of the one or more first spread-spectrum signals transmitted by the omnidirectional antenna, decode the remaining non-decoded portion of the received one or more second spread-spectrum signals, at the sector associated with the one or more decoded second spread-spectrum signal portions, and determine the corresponding direction of the sector as the direction to the survivor party aimed to be rescued.

In some cases, a distance between the omnidirectional antenna and the survivor device is determined by dividing a time gap between a transmission time of the one or more first spread-spectrum signals, transmitted by omnidirectional antenna, and a transmission time of the one or more second spread-spectrum signals, transmitted by the survivor device, by the speed of light.

In some cases, along with the reception of the one or more first spread-spectrum signals transmitted by the omnidirectional antenna, the survivor device receives the strength level of the one or more decoded second spread-spectrum signals received by the omnidirectional antenna and, based on said strength level, adjusts the transmission power of the following one or more second spread-spectrum signals, transmitted by the survivor device, thereby preserving the survivor device's battery life available for future communication and contributing to the secrecy of the transmitted one or more spread-spectrum signals.

In accordance with a third aspect of the presently disclosed subject matter, there is provided a directional search and rescue method comprising: receiving, by each sector of a plurality of sectors of an omnidirectional antenna, at periodic time intervals, one or more spread-spectrum signals transmitted by a survivor device associated with a survivor party aimed to be rescued, wherein: (a) each sector is associated with a corresponding direction, and (b) each of the one or more spread-spectrum signals is composed of one or more symbols multiplied by a spread spectrum sequence; decoding, at each sector of the plurality of sectors, the received one or more spread-spectrum signals, utilizing the spread spectrum sequence, given rise to one or more decoded spread-spectrum signals; determining, at each sector of the at least some sectors, a signal strength of the one or more decoded spread-spectrum signals; and, upon the signal strength determined at a given sector being above a strength threshold, determining the corresponding direction of the given sector as the direction to the survivor party aimed to be rescued.

In some cases, the signal strength is determined using a Received Signal Strength Indicator (RSSI).

In some cases, the determination of the corresponding direction of the given sector as the direction to the survivor party aimed to be rescued is further determined by: (a) determining, at each sector of the at least some sectors, a signal phase direction, and (b) determining whether the signal phase direction of each sector exceeds a signal phase direction threshold.

In some cases, the signal phase direction is determined using one of: phase direction-based methods, or combined phase and amplitude sensitive-based methods.

In some cases, the one or more spread-spectrum signals of the survivor device are transmitted in response to reception of one or more spread-spectrum signals transmitted by the omnidirectional antenna.

In some cases, a distance between the omnidirectional antenna and the survivor device is determined by dividing a time gap between a transmission time of the one or more spread-spectrum signals transmitted by the omnidirectional antenna and a transmission time of the one or more spread-spectrum signals transmitted by the survivor device, by the speed of light.

In some cases, along with the reception of the one or more spread-spectrum signals transmitted by the omnidirectional antenna, the survivor device receives the strength level of the one or more decoded spread-spectrum signals received by the omnidirectional antenna and, based on said strength level, adjusts the transmission power of the following one or more spread-spectrum signals, transmitted by the survivor device, thereby preserving the survivor device's battery life available for future communication and contributing to the secrecy of the transmitted one or more spread-spectrum signals.

In accordance with a fourth aspect of the presently disclosed subject matter, there is provided a directional search and rescue method comprising: transmitting, by an omnidirectional antenna including a plurality of sectors each of which is associated with a corresponding direction, one or more first spread-spectrum signals composed of one or more first symbols multiplied by a spread spectrum sequence; receiving, by each sector of the plurality of sectors of the omnidirectional antenna, at periodic time intervals, one or more second spread-spectrum signals, including one or more second symbols multiplied by the spread spectrum sequence, transmitted by a survivor device associated with a survivor party aimed to be rescued; decoding, at each sector of the plurality of sectors, at least a portion of the received one or more second spread-spectrum signals, given rise to one or more decoded second spread-spectrum signal portions; determining, at each sector of the plurality of sectors, whether the second symbols of the one or more second decoded spread-spectrum signal portions overlap with the first symbols of a respective portion of the one or more first spread-spectrum signals transmitted by the omnidirectional antenna; and upon the second symbols of the one or more decoded second spread-spectrum signal portions overlap with the first symbols of the respective portion of the one or more first spread-spectrum signals transmitted by the omnidirectional antenna, decoding the remaining non-decoded portion of the received one or more second spread-spectrum signals, at the sector associated with the one or more decoded second spread-spectrum signal portions, and determining the corresponding direction of the sector as the direction to the survivor party aimed to be rescued.

In some cases, a distance between the omnidirectional antenna and the survivor device is determined by dividing a time gap between a transmission time of the one or more first spread-spectrum signals, transmitted by omnidirectional antenna, and a transmission time of the one or more second spread-spectrum signals, transmitted by the survivor device, by the speed of light.

In some cases, along with the reception of the one or more first spread-spectrum signals transmitted by the omnidirectional antenna, the survivor device receives the strength level of the one or more decoded second spread-spectrum signals received by the omnidirectional antenna and, based on said strength level, adjusts the transmission power of the following one or more second spread-spectrum signals, transmitted by the survivor device, thereby preserving the survivor device's battery life available for future communication and contributing to the secrecy of the transmitted one or more spread-spectrum signals.

In accordance with a fifth aspect of the presently disclosed subject matter, there is provided a non-transitory computer readable storage medium having computer readable program code embodied therewith, the computer readable program code, executable by at least one processor to perform a directional search and rescue method, the method comprising: receiving, by each sector of a plurality of sectors of an omnidirectional antenna, at periodic time intervals, one or more spread-spectrum signals transmitted by a survivor device associated with a survivor party aimed to be rescued, wherein: (a) each sector is associated with a corresponding direction, and (b) each of the one or more spread-spectrum signals is composed of one or more symbols multiplied by a spread spectrum sequence: decoding, at each sector of the plurality of sectors, the received one or more spread-spectrum signals, utilizing the spread spectrum sequence, given rise to one or more decoded spread-spectrum signals; determining, at each sector of the at least some sectors, a signal strength of the one or more decoded spread-spectrum signals; and, upon the signal strength determined at a given sector being above a strength threshold, determining the corresponding direction of the given sector as the direction to the survivor party aimed to be rescued.

In accordance with a sixth aspect of the presently disclosed subject matter, there is provided a non-transitory computer readable storage medium having computer readable program code embodied therewith, the computer readable program code, executable by at least one processor to perform a directional search and rescue method, the method comprising: transmitting, by an omnidirectional antenna including a plurality of sectors each of which is associated with a corresponding direction, one or more first spread-spectrum signals composed of one or more first symbols multiplied by a spread spectrum sequence; receiving, by each sector of the plurality of sectors of the omnidirectional antenna, at periodic time intervals, one or more second spread-spectrum signals, including one or more second symbols multiplied by the spread spectrum sequence, transmitted by a survivor device associated with a survivor party aimed to be rescued; decoding, at each sector of the plurality of sectors, at least a portion of the received one or more second spread-spectrum signals, given rise to one or more decoded second spread-spectrum signal portions; determining, at each sector of the plurality of sectors, whether the second symbols of the one or more second decoded spread-spectrum signal portions overlap with the first symbols of a respective portion of the one or more first spread-spectrum signals transmitted by the omnidirectional antenna; and upon the second symbols of the one or more decoded second spread-spectrum signal portions overlap with the first symbols of the respective portion of the one or more first spread-spectrum signals transmitted by the omnidirectional antenna, decoding the remaining non-decoded portion of the received one or more second spread-spectrum signals, at the sector associated with the one or more decoded second spread-spectrum signal portions, and determining the corresponding direction of the sector as the direction to the survivor party aimed to be rescued.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
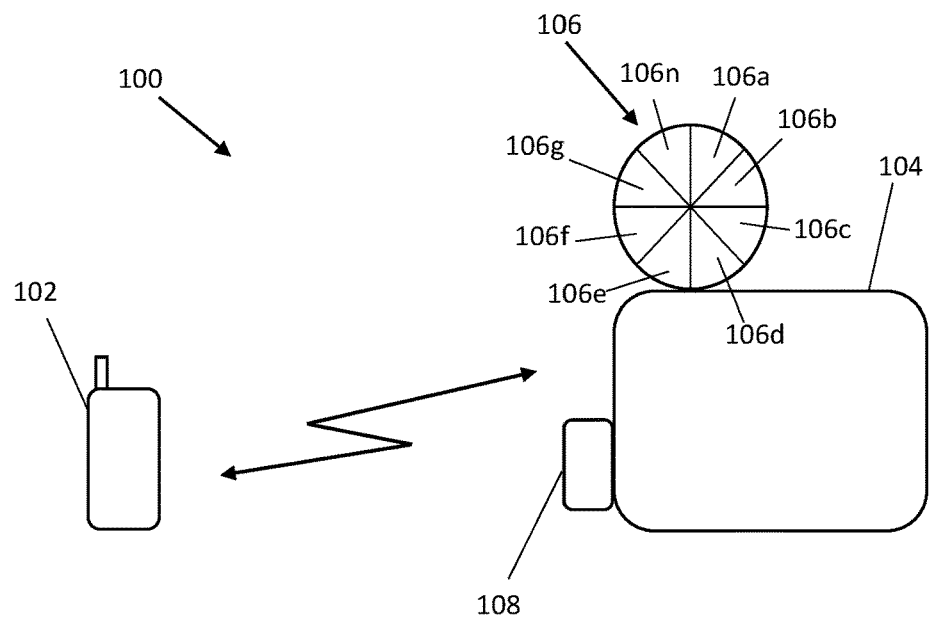
FIG. 1 is a schematic illustration of a search and rescue system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "decoding", "determining", "transmitting" or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in a least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
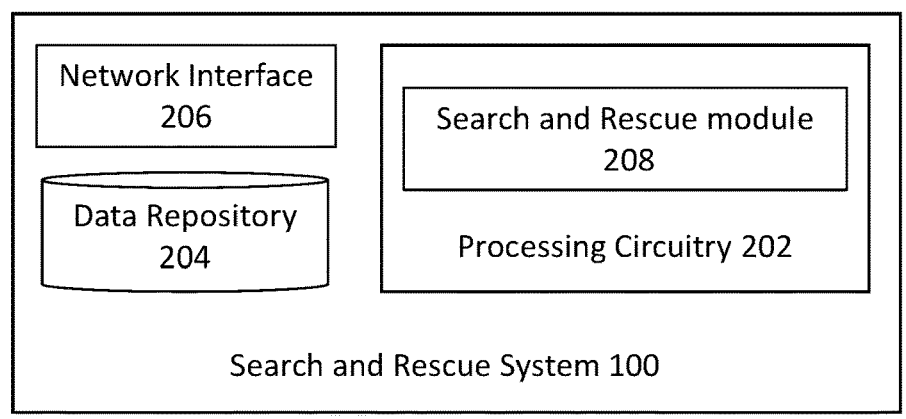
FIG. 2 is a block diagram schematically illustrating one example of components of a search and rescue system, in accordance with the presently disclosed subject matter.
Figure 3:
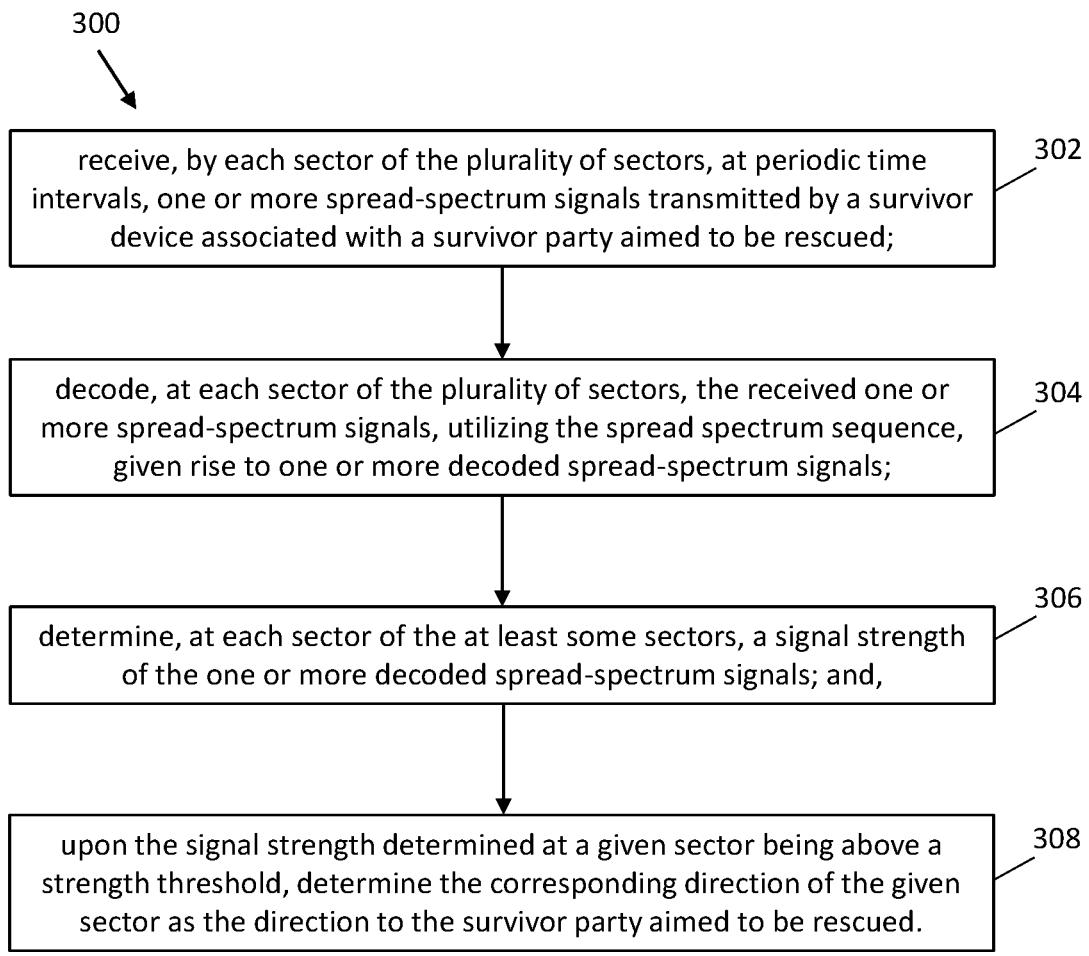
FIG. 3 is a flowchart illustrating an example of a sequence of operations carried out by a search and rescue system, in accordance with the presently disclosed subject matter; and, FIG. 4 is a flowchart illustrating another example of a sequence of operations carried out by a search and rescue system, in accordance with the presently disclosed subject matter.
Figure 4:
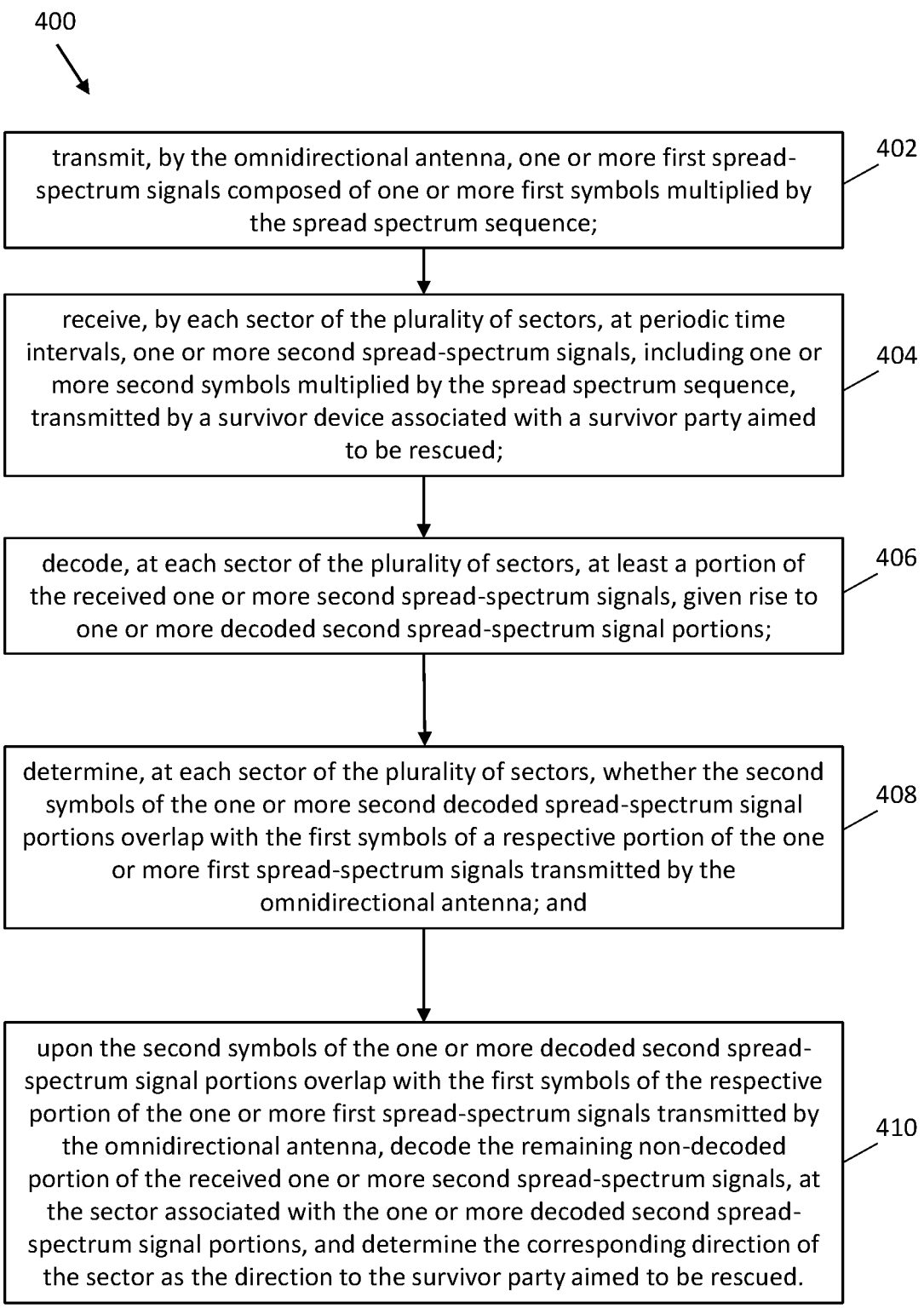

In embodiments of the presently disclosed subject matter, fewer, more and/or different stages than those shown in FIGS. 3 and 4 may be executed. In embodiments of the presently disclosed subject matter one or more stages illustrated in FIGS. 3 and 4 may be executed in a different order and/or one or more groups of stages may be executed simultaneously. FIG. 1 illustrate a general schematic of the system architecture in accordance with an embodiment of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, showing a schematic illustration of a search and rescue system (also interchangeably referred to herein as "system"), in accordance with the presently disclosed subject matter.

As shown in the schematic illustration, search and rescue system 100 includes (i) a survivor device 102 associated with a survivor party aimed to be rescued, and (ii) a search platform 104 associated with a rescuing party aimed to rescue the survivor party. The survivor party (e.g., a single survivor or a group of survivors) and the rescuing party (e.g., a single individual or a group of individuals, such as emergency services, response team, and the like) may initially be at a distance from one another. In one example, the survivor party may be found in a hostile environment (e.g., an enemy territory), whereas the rescuing party may be found in a friendly environment (e.g., an allied territory), remote from the hostile environment. In another example, the survivor party may be found in a first terrain type (e.g., a mountain), whereas the rescuing party may be found in a second terrain type (e.g., a valley), remote from the first terrain type.

The survivor device 102 may be, for example, a radio device capable of receiving and/or transmitting one or more inquiry signals (e.g., distress signals, and the like) from and/or to the search platform 104, via, for example, a bi-directional wireless communication. The one or more inquiry signals may be received and/or transmitted at periodic time intervals (for example, every defined period of seconds, every defined period of minutes, and the like) or at sporadic time intervals. In addition, the one or more inquiry signals may be received and/or transmitted in a stealth manner, utilizing a stealth communication technique, such that parties not intended to receive the inquiry signals would not be able to detect them. In one example, the inquiry signals may be spread-spectrum signals. In another example, additional or alternative to the above, the inquiry signals may be of other types of stealth communication techniques, such as Ultra-Wide Band (UWB) signals, etc.

The use of stealth communication techniques enables keeping the inquiry signals below a traceable noise level, such that hostile elements, located within the transmission range of the survivor device 102, would not be able to detect the inquiry signals, and as such, would not be able to reveal the location of the survivor party.

Turning to search platform 104, search platform 104 (for example, an aerial platform (e.g., a plane, a helicopter, a drone, etc.), a ground platform (e.g., a vehicle, a vessel, etc.), and the like) may include an antenna, for example, an omnidirectional antenna 106, capable of receiving the one or more inquiry signals transmitted by the survivor device 102. The omnidirectional antenna 106 may consist of a plurality of sectors, denoted 106a-106n ("n" being an arbitrary number representing any possible number of sectors), each of which may be associated with an angle in a 360-degree circle. The angle of each sector of the plurality of sectors may be associated with a distinct direction such that each sector may be capable of receiving one or more inquiry signals, transmitted in a stealth manner as explained hereinbefore, from its corresponding distinct direction. In one example, the angles may be of equal value. In another example, the angles may be of unequal values.

The use of a multi-sectional antenna may allow for rapid processing of a signal received in each sector, which enables saving processing time.

In some cases, the omnidirectional antenna 106 may also be capable of transmitting the one or more inquiry signals that are received by the survivor device 102. In other cases, the search platform 104 may include a radio device 108 directed to transmit the one or more inquiry signals that are received by the survivor device 102.

Based on the distinct direction associated with the sector through which the one or more inquiry signals are received, system 100 can determine the direction of the survivor device 102, and that of the survivor party aimed to be rescued, as will be explained hereinafter in relation to FIGS. 3 and 4.

Attention is now drawn to other components of the search and rescue system 100.

FIG. 2 is a block diagram schematically illustrating one example of the search and rescue system 100, in accordance with the presently disclosed subject matter.

In accordance with the presently disclosed subject matter, the search and rescue system 100 (also interchangeably referred to herein as "system 100") can comprise a network interface 206. The network interface 206 (e.g., a network card, a Li-Fi client, 3G/4G client, or any other component), enables system 100 to communicate over a network with external systems and handles inbound and outbound communications from such systems. For example, system 100 can receive, through network interface 206, one or more spread-spectrum signals composed of one or more symbols multiplied by a spread spectrum sequence.

In some cases, network interface 206 may be a wired network card used by system 200 so as to achieve a secured physical connection, thereby preventing access to the system 200, or any of its components, through a potentially unsecured wireless connection.

System 100 can further comprise or be otherwise associated with a data repository 204 (e.g., a database, a storage system, a memory including Read Only Memory-ROM, Random Access Memory-RAM, or any other type of memory, etc.) configured to store data. Some examples of data that can be stored in the data repository 204 include:

One or more decoded spread-spectrum signals;
One or more signal strengths of one or more decoded spread-spectrum signals;
One or more strength thresholds;
One or more directions of one or more survivor parties to be rescued;
One or more distances between the survivor device and the omnidirectional antenna;
One or more portions of decoded spread-spectrum signals;
One or more first and second symbols;

Data repository 204 can be further configured to enable retrieval and/or update and/or deletion of the stored data. It is to be noted that in some cases, data repository 204 can be distributed, while the system 100 has access to the information stored thereon, e.g., via a wired or wireless network to which system 100 is able to connect (utilizing its network interface 206).

System 100 further comprises processing circuitry 202. Processing circuitry 202 can be one or more processing units (e.g., central processing units), microprocessors, microcontrollers (e.g., microcontroller units (MCUs)) or any other computing devices or modules, including multiple and/or parallel and/or distributed processing units, which are adapted to independently or cooperatively process data for controlling relevant system 100 resources and for enabling operations related to system's 100 resources.

The processing circuitry 202 comprises a search and rescue module 208, configured to perform a search and rescue process, as further detailed herein, inter alia with reference to FIG. 3.

In some case, the processing circuitry 202 may be part of a component of the system 100 (e.g., the omnidirectional antenna 106). In other cases, the processing circuitry 202 may be part of a system external to system 100, which system 100 interacts with.

Turning to FIG. 3 there is shown a flowchart illustrating one example of operations carried out by the search and rescue system 100, in accordance with the presently disclosed subject matter.

Accordingly, the search and rescue system 100 (also interchangeably referred to hereafter as "system 100") can be configured to perform a search and rescue process 300, e.g., using search and rescue module 208.

For this purpose, system 100 receives, by each sector of the plurality of sectors of the omnidirectional antenna, at periodic time intervals, one or more spread-spectrum signals transmitted by a survivor device associated with a survivor party aimed to be rescued (block 302). Each received spread-spectrum signal may be composed of one or more symbols, forming a pattern that is multiplied by a spread spectrum sequence.

By way of a non-limiting example (presented merely for purposes of better understanding the disclosed subject matter and not in any way intended to limit its scope), system 100 includes an omnidirectional antenna of eight sectors, such that each sector of the eight sectors receives, at periodic time intervals of every three seconds, a spread-spectrum signal, transmitted by a survivor device, composed of a pattern of ten symbols, multiplied by a spread spectrum sequence.

Next, system 100 decodes, at each sector of the plurality of sectors, the received one or more spread-spectrum signals, utilizing the spread spectrum sequence, given rise to one or more decoded spread-spectrum signals (block 304).

In accordance with our non-limiting example described hereinbefore, at each sector of the eight sectors of the omnidirectional antenna, system 100 decodes the received spread-spectrum signal composed of the pattern of ten symbols multiplied by the spread spectrum sequence.

Once decoded, system 100 determines, at each sector of the plurality of sectors, a signal strength of the one or more decoded spread-spectrum signals (block 306), and upon the signal strength determined at a given sector being above a strength threshold, system 100 determines the corresponding direction of the given sector as the direction to the survivor party aimed to be rescued (block 308).

In accordance with our non-limiting example described hereinbefore, once decoded, system 100 determines, at each sector of the eight sectors of the omnidirectional antenna, a signal strength of the decoded spread-spectrum signal and compares it to a predefined strength threshold. Of the eight sectors, system 100 determine that only a single sector possesses a signal strength the exceeds the predefined strength threshold, and as such, determines the distinct direction of said single sector as the direction of the survivor device (and as a result of this the direction of survivor party).

In some cases, the signal strength may be determined using a Received Signal Strength Indicator (RSSI).

In some cases, the determination of the corresponding direction of the given sector as the direction to the survivor party aimed to be rescued may be further determined by: (a) determining, at each sector of the at least some sectors, a signal phase direction, and (b) determining whether the signal phase direction of each sector exceeds a signal phase direction threshold. In such cases, the signal phase direction may be determined using one of: phase direction-based methods, combined phase and amplitude sensitive-based methods, and the like.

In some cases, the one or more spread-spectrum signals of the survivor device are transmitted in response to reception of one or more spread-spectrum signal transmitted by the omnidirectional antenna. In such cases, along with the reception of the one or more spread-spectrum signals transmitted by the omnidirectional antenna, the survivor device receives the strength level of the one or more decoded spread-spectrum signals received by the omnidirectional antenna and, based on said strength level, adjusts the transmission power of the following one or more spread-spectrum signals, transmitted by it, thereby preserving its battery life available for future communication. In addition, the adjustment of the transmission power may contribute to the secrecy of the transferred one or more spread-spectrum signals, by keeping these signals below and/or deeply below a traceable noise level.

In some cases, in addition to the direction to the survivor party aimed to be rescued, system 100 determines the distance between the omnidirectional antenna and the survivor device by dividing the time gap between the transmission time of the one or more spread-spectrum signals transmitted by the omnidirectional antenna and the transmission time of the one or more spread-spectrum signals transmitted by the survivor device, by the speed of light.

Turning to FIG. 4 there is shown a flowchart illustrating another example of operations carried out by the search and rescue system 100, in accordance with the presently disclosed subject matter.

Accordingly, the search and rescue system 100 (also interchangeably referred to hereafter as "system 100") can be configured to perform a search and rescue process 400, e.g., using search and rescue module 208.

For this purpose, system 100 transmits, by the omnidirectional antenna, one or more spread-spectrum signals composed of one or more first symbols multiplied by the spread spectrum sequence (block 402). The one or more first symbols, or at least a collection of them, may form an identification pattern associated with the transmitted one or more spread-spectrum signals.

By way of a non-limiting example (presented merely for purposes of better understanding the disclosed subject matter and not in any way intended to limit its scope), system 100 transmits, by its omnidirectional antenna of eight sectors, spread-spectrum signals composed of ten first symbols multiplied by the spread spectrum sequence. Of the ten first symbols, the first three symbols form an identification pattern.

Next, system 100 receives, by each sector of the plurality of sectors, at periodic time intervals, one or more spread-spectrum signals, including one or more second symbols multiplied by the spread spectrum sequence, transmitted by a survivor device associated with a survivor party aimed to be rescued (block 404).

In accordance with our non-limiting example described hereinbefore, the omnidirectional antenna of eight sectors of system 100 receives, by each of its sectors, at periodic time intervals of every three seconds, a spread-spectrum signal, transmitted by a survivor device. The spread-spectrum signal is composed of a pattern of ten second symbols multiplied by the spread spectrum sequence.

With the receiving of the one or more spread-spectrum signals, system 100 decodes, at each sector of the plurality of sectors, at least a portion of the received one or more spread-spectrum signals, given rise to one or more decoded second spread-spectrum signal portions (block 406).

In accordance with our non-limiting example described hereinbefore, at each sector of the eight sectors of the omnidirectional antenna, system 100 decodes a portion of three second symbols of the received spread-spectrum signals (composed of the pattern of ten second symbols multiplied by the spread spectrum sequence), given rise to decoded spread-spectrum signal portions.

Once decoded, system 100 determines, at each sector of the plurality of sectors, whether the second symbols of the one or more decoded spread-spectrum signal portion overlap with the first symbols of a respective portion of the one or more first spread-spectrum signals transmitted by the omnidirectional antenna (block 408).

In accordance with our non-limiting example described hereinbefore, once decoded, system 100 determines, at each sector of the eight sectors of the omnidirectional antenna, whether the decoded spread-spectrum signal portion of three second symbols overlaps with the identification pattern of the first three symbols of the spread-spectrum signals initially transmitted by the omnidirectional antenna.

Upon the second symbols of the one or more decoded spread-spectrum signal portion overlap with the first symbols of the respective portion of the one or more spread-spectrum signals transmitted by the omnidirectional antenna, decode the remaining non-decoded portion of the received one or more spread-spectrum signals, at the sector associated with the one or more decoded spread-spectrum signal portion, and determine the corresponding direction of the sector as the direction to the survivor party aimed to be rescued (block 410).

In accordance with our non-limiting example described above, of the eight sectors, system 100 determines that only a single sector includes a signal portion of a decoded spectrum of three second symbols that coincides with the detection pattern of the first three symbols of the spread spectrum signals first transmitted by the omnidirectional antenna. As a result, system 100 decodes the remaining non-decoded portion of the one or more remote signals received, in the determined single sector, and determines the appropriate direction of the single sector as the direction to the surviving party intended to be extracted.

In some cases, in addition to the direction to the survivor party aimed to be rescued, system 100 determines the distance between the omnidirectional antenna and the survivor device by dividing the time gap between the transmission time of the one or more spread-spectrum signals transmitted by the omnidirectional antenna and the transmission time of the one or more spread-spectrum signals transmitted by the survivor device, by the speed of light.

In some cases, along with the reception of the one or more spread-spectrum signals transmitted by the omnidirectional antenna, the survivor device receives the strength level of the one or more decoded spread-spectrum signals received by the omnidirectional antenna and, based on said strength level, adjusts the transmission power of the following one or more spread-spectrum signals, transmitted by it, thereby preserving its battery life available for future communication. In addition, the adjustment of the transmission power may contribute to the secrecy of the transferred one or more spread-spectrum signals, by keeping these signals below and/or deeply below a traceable noise level.

It is to be noted, with reference to FIGS. 3 and 4, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A directional search and rescue system containing an omnidirectional antenna including a plurality of sectors, each sector capable of receiving one or more spread-spectrum signals composed of one or more symbols multiplied by a spread spectrum sequence, from a corresponding direction, the directional search and rescue system comprising a processing circuitry configured to:

receive, by each sector of the plurality of sectors, at periodic time intervals, one or more spread-spectrum signals transmitted by a survivor device associated with a survivor party aimed to be rescued;

decode, at each sector of the plurality of sectors, the received one or more spread-spectrum signals, utilizing the spread spectrum sequence, given rise to one or more decoded spread-spectrum signals;

determine, at each sector of the at least some sectors, a signal strength of the one or more decoded spread-spectrum signals; and, upon the signal strength determined at a given sector being above a strength threshold, determine the corresponding direction of the given sector as the direction to the survivor party aimed to be rescued.

2. The directional search and rescue system of claim 1, wherein the determination of the corresponding direction of the given sector as the direction to the survivor party aimed to be rescued is further determined by: (a) determining, at each sector of the at least some sectors, a signal phase direction, and (b) determining whether the signal phase direction of each sector exceeds a signal phase direction threshold.

3. The directional search and rescue system of claim 2, wherein the signal phase direction is determined using one of: phase direction-based methods, or combined phase and amplitude sensitive-based methods.

4. The directional search and rescue system of claim 1, wherein the one or more spread-spectrum signals of the survivor device are transmitted in response to reception of one or more spread-spectrum signals transmitted by the omnidirectional antenna.

5. The directional search and rescue system of claim 4, wherein a distance between the omnidirectional antenna and the survivor device is determined by dividing a time gap between a transmission time of the one or more spread-spectrum signals transmitted by the omnidirectional antenna and a transmission time of the one or more spread-spectrum signals transmitted by the survivor device, by the speed of light.

6. The directional search and rescue system of claim 4, wherein along with the reception of the one or more spread-spectrum signals transmitted by the omnidirectional antenna, the survivor device receives the strength level of the one or more decoded spread-spectrum signals received by the omnidirectional antenna and, based on said strength level, adjusts the transmission power of the following one or more spread-spectrum signals, transmitted by the survivor device, thereby preserving the survivor device's battery life available for future communication and contributing to the secrecy of the transmitted one or more spread-spectrum signals.

7. A directional search and rescue system containing an omnidirectional antenna including a plurality of sectors, each sector capable of receiving, from a corresponding direction, one or more spread-spectrum signals composed of one or more symbols multiplied by a spread spectrum sequence, the directional search and rescue system comprising a processing circuitry configured to:

transmit, by the omnidirectional antenna, one or more first spread-spectrum signals composed of one or more first symbols multiplied by the spread spectrum sequence;

receive, by each sector of the plurality of sectors, at periodic time intervals, one or more second spread-spectrum signals, including one or more second symbols multiplied by the spread spectrum sequence, transmitted by a survivor device associated with a survivor party aimed to be rescued;

decode, at each sector of the plurality of sectors, at least a portion of the received one or more second spread-spectrum signals, given rise to one or more decoded second spread-spectrum signal portions, determine, at each sector of the plurality of sectors, whether the second symbols of the one or more second decoded spread-spectrum signal portions overlap with the first symbols of a respective portion of the one or more first spread-spectrum signals transmitted by the omnidirectional antenna; and upon the second symbols of the one or more decoded second spread-spectrum signal portions overlap with the first symbols of the respective portion of the one or more first spread-spectrum signals transmitted by the omnidirectional antenna, decode the remaining non-decoded portion of the received one or more second spread-spectrum signals, at the sector associated with the one or more decoded second spread-spectrum signal portions, and determine the corresponding direction of the sector as the direction to the survivor party aimed to be rescued.

8. The directional search and rescue system of claim 7, wherein a distance between the omnidirectional antenna and the survivor device is determined by dividing a time gap between a transmission time of the one or more first spread-spectrum signals, transmitted by omnidirectional antenna, and a transmission time of the one or more second spread-spectrum signals, transmitted by the survivor device, by the speed of light.

9. The directional search and rescue system of claim 7, wherein along with the reception of the one or more first spread-spectrum signals transmitted by the omnidirectional antenna, the survivor device receives the strength level of the one or more decoded second spread-spectrum signals received by the omnidirectional antenna and, based on said strength level, adjusts the transmission power of the following one or more second spread-spectrum signals, transmitted by the survivor device, thereby preserving the survivor device's battery life available for future communication and contributing to the secrecy of the transmitted one or more spread-spectrum signals.

10. A directional search and rescue method comprising:

transmitting, by an omnidirectional antenna including a plurality of sectors each of which is associated with a corresponding direction, one or more first spread-spectrum signals composed of one or more first symbols multiplied by a spread spectrum sequence;

receiving, by each sector of the plurality of sectors of the omnidirectional antenna, at periodic time intervals, one or more second spread-spectrum signals, including one or more second symbols multiplied by the spread spectrum sequence, transmitted by a survivor device associated with a survivor party aimed to be rescued;

decoding, at each sector of the plurality of sectors, at least a portion of the received one or more second spread-spectrum signals, given rise to one or more decoded second spread-spectrum signal portions;

determining, at each sector of the plurality of sectors, whether the second symbols of the one or more second decoded spread-spectrum signal portions overlap with the first symbols of a respective portion of the one or more first spread-spectrum signals transmitted by the omnidirectional antenna; and upon the second symbols of the one or more decoded second spread-spectrum signal portions overlap with the first symbols of the respective portion of the one or more first spread-spectrum signals transmitted by the omnidirectional antenna, decoding the remaining non-decoded portion of the received one or more second spread-spectrum signals, at the sector associated with the one or more decoded second spread-spectrum signal portions, and determining the corresponding direction of the sector as the direction to the survivor party aimed to be rescued.

11. The directional search and rescue method of claim 10, wherein a distance between the omnidirectional antenna and the survivor device is determined by dividing a time gap between a transmission time of the one or more first spread-spectrum signals, transmitted by omnidirectional antenna, and a transmission time of the one or more second spread-spectrum signals, transmitted by the survivor device, by the speed of light.

12. The directional search and rescue method of claim 10, wherein along with the reception of the one or more first spread-spectrum signals transmitted by the omnidirectional antenna, the survivor device receives the strength level of the one or more decoded second spread-spectrum signals received by the omnidirectional antenna and, based on said strength level, adjusts the transmission power of the following one or more second spread-spectrum signals, transmitted by the survivor device, thereby preserving the survivor device's battery life available for future communication and contributing to the secrecy of the transmitted one or more spread-spectrum signals.

13. A non-transitory computer readable storage medium having computer readable program code embodied therewith, the computer readable program code, executable by at least one processor to perform a directional search and rescue method, the method comprising:

transmitting, by an omnidirectional antenna including a plurality of sectors each of which is associated with a corresponding direction, one or more first spread-spectrum signals composed of one or more first symbols multiplied by a spread spectrum sequence;

receiving, by each sector of the plurality of sectors of the omnidirectional antenna, at periodic time intervals, one or more second spread-spectrum signals, including one or more second symbols multiplied by the spread spectrum sequence, transmitted by a survivor device associated with a survivor party aimed to be rescued;

decoding, at each sector of the plurality of sectors, at least a portion of the received one or more second spread-spectrum signals, given rise to one or more decoded second spread-spectrum signal portions;

determining, at each sector of the plurality of sectors, whether the second symbols of the one or more second decoded spread-spectrum signal portions overlap with the first symbols of a respective portion of the one or more first spread-spectrum signals transmitted by the omnidirectional antenna; and upon the second symbols of the one or more decoded second spread-spectrum signal portions overlap with the first symbols of the respective portion of the one or more first spread-spectrum signals transmitted by the omnidirectional antenna, decoding the remaining non-decoded portion of the received one or more second spread-spectrum signals, at the sector associated with the one or more decoded second spread-spectrum signal portions, and determining the corresponding direction of the sector as the direction to the survivor party aimed to be rescued.

14. The directional search and rescue system of claim 1, wherein the signal strength is determined using a Received Signal Strength Indicator (RSSI).

* * * * *